(12) United States Patent
Tindal et al.

(10) Patent No.: US 7,054,946 B2
(45) Date of Patent: May 30, 2006

(54) DYNAMIC CONFIGURATION OF NETWORK DEVICES TO ENABLE DATA TRANSFERS

(75) Inventors: Glen D. Tindal, Boulder, CO (US); Jeffery A. Schenk, San Luis Obispo, CA (US)

(73) Assignee: Intelliden, Colorado Springs, CO (US)

( * ) Notice: Subject to any disclaimer, the term of this patent is extended or adjusted under 35 U.S.C. 154(b) by 1087 days.

(21) Appl. No.: 09/730,671

(22) Filed: Dec. 6, 2000

(65) Prior Publication Data

US 2002/0069291 A1   Jun. 6, 2002

(51) Int. Cl.
*G06F 15/16* (2006.01)
(52) U.S. Cl. ............................. 709/232; 709/228
(58) Field of Classification Search ............. 709/228, 709/241, 221, 232; 370/252, 412; 707/105
See application file for complete search history.

(56) References Cited

U.S. PATENT DOCUMENTS

| | | |
|---|---|---|
| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,519,704 A | 5/1996 | Farinacci et al. |
| 5,557,748 A | 9/1996 | Norris |
| 5,581,764 A | 12/1996 | Fitzgerald et al. |
| 5,724,509 A | 3/1998 | Starkweather et al. |
| 5,726,883 A | 3/1998 | Levine et al. |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |
| 5,819,028 A | 10/1998 | Manghirmalani et al. |
| 5,832,503 A | 11/1998 | Malik et al. |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,884,028 A | 3/1999 | Kindell et al. |
| 5,889,953 A | 3/1999 | Thebaut et al. |
| 5,920,701 A * | 7/1999 | Miller et al. ................. 709/228 |
| 5,944,782 A | 8/1999 | Noble et al. |

(Continued)

FOREIGN PATENT DOCUMENTS

EP    0 384 339 A2    8/1990

(Continued)

OTHER PUBLICATIONS

Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.

(Continued)

*Primary Examiner*—John Follansbee
*Assistant Examiner*—Kenny Lin
(74) *Attorney, Agent, or Firm*—Cooley Godward LLP

(57) ABSTRACT

A system and method for optimizing the use of network resources is described. In one embodiment, an enterprise first requests provisioning of network resources for a particular transaction. Responsive to that request, network resources are dynamically configured to meet the enterprise's request. When the transaction is complete, the network resources are returned to a default state.

17 Claims, 5 Drawing Sheets

U.S. PATENT DOCUMENTS

| | | | |
|---|---|---|---|
| 5,948,065 A | 9/1999 | Eilert et al. | |
| 5,956,341 A * | 9/1999 | Galand et al. | 370/412 |
| 5,961,594 A | 10/1999 | Bouvier et al. | |
| 5,968,122 A | 10/1999 | Schlosser et al. | |
| 5,968,176 A | 10/1999 | Nessett et al. | |
| 5,974,236 A | 10/1999 | Sherman | |
| 5,980,078 A | 11/1999 | Krivoshein et al. | |
| 6,006,035 A | 12/1999 | Nabahi | |
| 6,016,306 A | 1/2000 | Le Boudec et al. | |
| 6,023,586 A | 2/2000 | Gaisford et al. | |
| 6,028,846 A | 2/2000 | Cain | |
| 6,041,347 A | 3/2000 | Harsham et al. | |
| 6,049,828 A | 4/2000 | Dev et al. | |
| 6,055,568 A | 4/2000 | Adams | |
| 6,097,697 A | 8/2000 | Yao et al. | |
| 6,098,094 A | 8/2000 | Barnhouse et al. | |
| 6,098,101 A | 8/2000 | Sears | |
| 6,098,108 A | 8/2000 | Sridhar et al. | |
| 6,101,508 A | 8/2000 | Wolff | |
| 6,104,700 A | 8/2000 | Haddock et al. | |
| 6,105,069 A | 8/2000 | Franklin et al. | |
| 6,108,699 A | 8/2000 | Moiin | |
| 6,108,703 A | 8/2000 | Leighton et al. | |
| 6,122,664 A | 9/2000 | Boukobza et al. | |
| 6,128,729 A | 10/2000 | Kimball et al. | |
| 6,131,118 A | 10/2000 | Stupek, Jr. et al. | |
| 6,131,119 A | 10/2000 | Fukui | |
| 6,154,776 A | 11/2000 | Martin | |
| 6,167,445 A | 12/2000 | Gai et al. | |
| 6,170,009 B1 | 1/2001 | Mandal et al. | |
| 6,170,011 B1 | 1/2001 | Macleod Beck et al. | |
| 6,182,094 B1 | 1/2001 | Humpleman et al. | |
| 6,198,479 B1 | 3/2001 | Humpleman et al. | |
| 6,202,090 B1 | 3/2001 | Simone | |
| 6,243,747 B1 | 6/2001 | Lewis et al. | |
| 6,260,072 B1 * | 7/2001 | Rodriguez-Moral | 709/241 |
| 6,269,398 B1 | 7/2001 | Leong et al. | |
| 6,292,889 B1 | 9/2001 | Fitzgerald et al. | |
| 6,349,306 B1 | 2/2002 | Malik et al. | |
| 6,356,955 B1 | 3/2002 | Hollberg et al. | |
| 6,363,411 B1 | 3/2002 | Dugan et al. | |
| 6,370,119 B1 * | 4/2002 | Basso et al. | 370/252 |
| 6,381,631 B1 | 4/2002 | Van Hoff | |
| 6,393,425 B1 | 5/2002 | Kelly | |
| 6,418,468 B1 | 7/2002 | Ahlstrom et al. | |
| 6,438,594 B1 | 8/2002 | Bowman-Amuah | |
| 6,442,608 B1 | 8/2002 | Knight et al. | |
| 6,449,638 B1 | 9/2002 | Wecker et al. | |
| 6,463,583 B1 | 10/2002 | Hammond | |
| 6,496,843 B1 | 12/2002 | Getchius et al. | |
| 6,539,425 B1 | 3/2003 | Stevens et al. | |
| 6,550,060 B1 | 4/2003 | Hammond | |
| 6,567,406 B1 | 5/2003 | Skemer | |
| 6,609,108 B1 | 8/2003 | Pulliam et al. | |
| 6,615,166 B1 | 9/2003 | Guheen et al. | |
| 6,625,590 B1 | 9/2003 | Chen et al. | |
| 6,636,877 B1 | 10/2003 | Doleac et al. | |
| 6,643,640 B1 | 11/2003 | Getchius et al. | |
| 6,654,799 B1 | 11/2003 | Tanaka | |
| 6,658,526 B1 | 12/2003 | Nguyen et al. | |
| 6,678,827 B1 | 1/2004 | Rothermel et al. | |
| 6,684,244 B1 | 1/2004 | Goldman et al. | |
| 6,697,967 B1 | 2/2004 | Robertson | |
| 6,725,233 B1 | 4/2004 | Froyd et al. | |
| 6,769,116 B1 | 7/2004 | Sexton | |
| 6,775,698 B1 | 8/2004 | Simone | |
| 6,826,597 B1 | 11/2004 | Lonnroth et al. | |
| 2002/0032769 A1 | 3/2002 | Barkai et al. | |
| 2002/0038320 A1 | 3/2002 | Brook | |
| 2002/0051080 A1 | 5/2002 | Tanaka | |
| 2002/0171762 A1 | 11/2002 | Maxson | |
| 2002/0174091 A1 | 11/2002 | Froyd et al. | |
| 2002/0191619 A1 | 12/2002 | Shafer | |
| 2002/0198974 A1 | 12/2002 | Shafer | |
| 2003/0033589 A1 | 2/2003 | Reyna et al. | |
| 2003/0037040 A1 | 2/2003 | Beadles et al. | |
| 2003/0048287 A1 | 3/2003 | Little et al. | |
| 2003/0135508 A1 | 7/2003 | Chorafakis et al. | |
| 2004/0078695 A1 | 4/2004 | Bowers et al. | |
| 2004/0225865 A1 | 11/2004 | Cox et al. | |

FOREIGN PATENT DOCUMENTS

| | | |
|---|---|---|
| EP | 0 762 281 A | 3/1997 |
| EP | 0 810 755 A2 | 12/1997 |
| EP | 0 762 281 A3 | 3/1999 |
| EP | 0 973 296 A2 | 1/2000 |
| EP | 0 993 725 A1 | 4/2000 |
| EP | 1 011 230 A | 6/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| WO | WO 95/08794 | 3/1995 |
| WO | WO 95/24802 A | 9/1995 |
| WO | WO 95 24802 A | 9/1995 |
| WO | WO 97/49214 | 12/1997 |
| WO | WO 98 18235 A | 4/1998 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.

"FFST/2 Generic Alert Router for LAN and SNA Transports," IBM Technical Disclosure Bulletin, IBM Corp. New York, US, vol. 34, No. 11, Apr. 1, 1992, pp. 467 XP000303331, ISN: 0018-8689.

Torrente S et al.: "Implementation of the ANSI TIM1.5 GBM-T1.214 within an ODBMS framework" Networking: Foundation foar the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875-884, XP010032227, ISBN: 0-816-3580-).

Lee, W.C. et al: "Routing Subject to Quality of Service Constraints in Integrated Communications Networks" IEEE Network, IEEE Inc. New York, US, vol. 9, No. 4, Jul. 1, 1995, pp. 46-55, XP000526591, ISSN: 0890-8044 the whole document.

Williams R: "Web Based Enterprise Management W101" DMTF 1999 Annual Conference, 'Online! Jun. 15-16, 1999, pp. 1-21.

PCT/US 01/45668—International Search Report dated Oct. 16, 2002.
PCT/US 01/45669—International Search Report dated Oct. 16, 2002.
PCT/US 01/45671—International Search Report dated Oct. 16, 2002.
PCT/US 01/45670—International Search Report dated Dec. 20, 2002.
PCT/US 01/45672—International Search Report dated Apr. 14, 2003.
PCT/US 01/45671—Written Opinion Dec. 13, 2002.
Strassner, John; Technology Series—*Directory Enabled Networks,* 1999; MacMillan Technical Publishing USA.
"FFST/2 Generic Alert Router for LAN and SNA Transports," IBM Technical Disclosure Bulletin, IBM Corp. New York, US, vol. 34, No. 11, Apr. 1, 1992, pp. 467-468, XP000303331, ISN: 0018-8689.
ISM Customer—Aware™ Deep Discovery™; CoManage Coporation; As of Dec. 5, 2000 (2 pages).
ISM Customer—Aware™ Fault and Performance Management; CoManage Corporation; As of Dec. 5, 2000 (2 pages).
ISM Customer—Aware™ Provisioning; CoManage Corporation; As of Dec. 5, 2000 (2 pages).
ISM Customer— Aware™ Query; CoManage Corporation; As of Dec. 5, 2000 (2 pages).
ISM Customer—Aware™ Service Profiling; CoManage Corporation; As of Dec. 5, 2002 (2 pages).
Kennedy T W: "Network Operations & Management Tool Requirements for the 90s" Proceedings of the Network Operations and Management Symposium (NOMS). Memphis, Apr. 6-9, 1992, New York, IEEE, U.S. vol. 1, 1992, pp. 122-132.
Lee, W.C. et al: "Routing Subject to Quality of Service Constraints in Integrated Communication Networks" IEEE Network, IEEE Inc. New York, US, vol. 9, No. 4, Jul 1, 1995, pp. 46-55, XP000526591, ISSN: 0890-8044 the whole document.
Managing Managed Network Services: The Service Provider Blind Spot; Infonetics Research, The Networking Information Source; Jun. 2000 (18 pages).
PCT/US 01/45671—Written Opinion dated Dec. 13, 2002.
Torrente, S, et al: "Implementation of the ANSI TIM1.5 GBM-T1.214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 1993, pp. 875-884, XP010032227, ISBN: 0-8186-3580-0.
Williams, R. "Web Based Enterprise Management W101" DMTF 1999 Annual Conference, 'Online! Jun. 15-16, 1999, pp. 1-21.
Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.
Strassner, John: Technology Series—*Directory Enabled Networks,* 1999; MacMillan Technical Publishing USA.
Deca, Rudy, Cherkaoui, Omar and Puche, Daniel, *A Validation Solution for Network Configuration,* Jan. 2002, pp. 1-17.

Lonvick, C. The BSD syslog Protocol. RFC 3164 [online], Aug. 2001 [retrieved on Mar. 25 2002]. Retrieved from the Internet, <url: HTTP://www.ietf.org/rfc/rfc3164.txt>.
Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.
Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.
Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state/edu/cgi-bin/rfc/rfc1492.html>.
Anderson, B.A. TACACS User Identification Telnet Option. RFC 927 [online], Dec. 1984 [retrieved on Mar. 25, 2002]. Retrieved from the Internet <URL: http://www.ietf/org/rfc/rfc0927.txt>.
Rigney, C., et al., Remote Authentication Dial In User Service (RADIUS). RFC 2138 [online], Apr. 1997 retrieved on Mar. 25, 2002. Retrieved from the Internet <URL: http://www.ietf.org/rfc/rfc2138.txt>.
Rigney, C., RADIUS Accounting. RFC 2139 [online], Apr. 1997 [retrieved on Mar. 25, 2002]. Retrieved from the Internet <URL: http://www.ietf.org/rfc/rfc2139.txt>.
Postel, J., and Reynolds, J. Telnet Protocol Specification. RFC 854 [online], May 1983 [retrieved on Mar. 25, 2002]. Retrieved from the Internet >URL: http://www.ietf.org/rfc/rfc0854.txt>.
Gold Wire Technology, "Tracking Changes." In *Formulator 1.0 User Guide,* pp. 211-224, no date.
Lewis, L., *"Policy-Based Configuration Management: A Perspective from a Network Management Vendor,* " http://www.simple-times/org/pub/simple-times/issues/8-1.html., pp. 7-27, Sep. 2000.
Waldbusser, ST., et al., "Policy Based Management MIB," http://www.ietf.org/internet-drafts/draft-ietf-snmpconf-pm-05.txt, pp. 1-102, Mar. 1, 2001.
Strassner, J., *A New Paradigm for Network Management: Business Driven Device Management,*[online], 2002, http://www.ssgrr.it/en/ssgrr2002s/papers/htm, http://www.ssgrr.it/en/ssgn2002s/papers/162.pdf.
Managing Managed Network Services: The Service Provider Blind Spot; Infonetics Research, The Networking Information Source; Jun. 2000 (18 pages).
ISM Customer—Aware™ Query; CoManage Corporation; as of Dec. 5, 2000 (2 pages).
ISM Customer—Aware™ Provisioning; CoManage Corporation; as of Dec. 5, 2000 (2 pages).
ISM Customer—Aware™ Deep Discovery™; CoManage Corporation; as of Dec. 5, 2000 (2 pages).
ISM Customer—Aware™ Service Profiling; CoManage Corporation; as of Dec. 5, 2000 (2 pages).
ISM Customer—Aware™ Fault and Performance Management; CoManage Corporation; as of Dec. 5, 2000 (2 pages).

* cited by examiner

DYNAMIC CONFIGURATION OF NETWORK DEVICES TO ENABLE DATA TRANSFERS

RELATED APPLICATIONS

The following commonly owned and assigned patent applications are hereby incorporated by reference in their entirety:

1) Copending patent application Ser. No. 09/730,864, entitled *System and Method for Configuration, Management and Monitoring of Network Resources*, filed on Dec. 6, 2000:

2) Copending patent application Ser. No. 09/730,680, entitled *System and Method for Redirecting Data Generated by Network Devices*, filed on Dec. 6, 2000;

3) Copending patent application Ser. No. 09/730,683, entitled *Event Manager for Network Operating System*, filed on Dec. 6, 2000;

4) Copending patent application Ser. No. 10/213,949, entitled *Network Component Configuration and Management Method*, filed on Dec. 6, 2000; and 5) Copending patent application Ser. No. 09/730,682, entitled *Network Operating System Data Directory*, filed on Dec. 6, 2000.

FIELD OF THE INVENTION

The present invention relates generally to network systems. More particularly, but not by way of limitation, the present invention relates to systems and methods for dynamic configuration of network devices to thereby enable efficient data transfers.

BACKGROUND OF THE INVENTION

Data and the effective, timely movement of data has become the lifeblood of many modern enterprises. Unfortunately, network infrastructure limitations are impinging upon the ability of enterprises to timely move data. Enterprises that require data to be delivered within very strict time requirements are being most severely impacted by these network infrastructure limitations. To guarantee the timely delivery of their data, these enterprise often are forced to pay steep prices. Moreover, network providers are being forced continually to upgrade their infrastructure to supply even the basic services to their customers. Accordingly, the networking community is searching for a method and system to better and more economically utilize the existing network infrastructure, thereby improving the transfer of data and reducing the associated cost.

With regard to the actual transmission of data, enterprises are searching for a way to pay only for the bandwidth that they use. In essence, they are looking to optimize the use of bandwidth. Presently, an enterprise that requires the bandwidth provided, for example, by a T1 line may be forced to rent a dedicated T1 line for an entire month even though the enterprise may only need the T1 line for a few days within that month. Renting the T1 line for such an extended period is wasteful on two fronts. First, the enterprise is paying for many days of service that it does not use. Preferably, an enterprise should only pay for the service that it actually uses. Second, the bandwidth available on the T1 line for those unused days is wasted because other enterprises do not have access to it. If this unused bandwidth can be captured and made available to other enterprises, the existing network infrastructure can be better utilized to meet the demands of more enterprises. Unfortunately, no device or method exists to effectively optimize the provisioning of bandwidth. Thus, even though dedicated lines are expensive and cumbersome, companies requiring rapid, predictable transfer of data presently have no other acceptable option.

With regard to the actual routing of data, enterprises are searching for an efficient way to route data based upon priority. Several methods have been developed to aid in routing data based upon priority. These present methods, however, are not completely satisfactory. For example, a feature called weighted fair queuing can be enabled on modern routers. This feature requires that the router read a precedence bit from each packet being passed through the router and then queue lower priority packets while routing higher priority packets. Although weighted fair queuing can be effective, it requires a great deal of processing power and memory within each router, and when enabled for a long period of time, weighted fair queuing can cause a router to crash. Additionally, because weighted fair queuing requires a router to analyze each packet that it receives, it slows the overall operation of the router and, thus, the network.

Because router configuration is a somewhat complicated and time consuming process, especially if numerous routers are involved, network administrators tend to configure routers in the network either to use weighted fair queuing at all times or not to use weighted fair queuing at all. In reality, most network administrators would like to use weighted fair queuing some of the time and disable it the rest of the time. Unfortunately, selectively enabling and disabling weighted fair queuing is so cumbersome that it cannot be effectively implemented. Accordingly, a device and method are needed to selectively enable router optimization techniques such as weighted fair queuing.

Because the present network technology suffers from significant drawbacks, a solution is needed that can efficiently and effectively optimize a network to enable a more efficient transfer of data. In particular, a system and method are needed in which both the bandwidth usage and/or the router performance can be easily optimized. Such a system and method would not only address the needs of the network community, but also provide new advantages such as content transfer optimization.

SUMMARY OF THE INVENTION

To address the problems and limitations of present network technology, the present invention provides for an efficient, effective optimization of a network to enable data transfers. In particular, but not by way of limitation, the present invention provides a method and apparatus to optimize bandwidth usage, routing performance and content delivery.

In one embodiment, for example, a network provider (or manager) can receive a request to transfer a block of data between two points. Such a request could indicate the identity of the party requesting the transfer and the volume of data to be transferred. The network provider could then identify the services to which the requesting party is entitled. For example, the network provider could determine whether the data block should be transferred with a high priority, a medium priority, or a low priority.

After the network provider has determined the appropriate level of service to assign to the data transfer, it can identify the path and associated network devices for transferring the data. Next, using a system in accordance with the present invention, the network devices along that path can be dynamically configured to handle the data transfer within the appropriate service level. For example, priority data handling features (such as weighted fair queuing) can be enabled on the appropriate routers. Additionally, or even alternatively, a virtual, dedicated line between the two transfer points can be established by reconfiguring the appropriate optical devices. Once the data transfer has been completed, the priority data handling features can be disabled and/or the virtual dedicated line between the two points can be torn down.

Accordingly, in the above-described embodiment, network resources can be provisioned "just-in-time." Moreover, when network resources are not being used, they can be returned to the pool of available resources, and when special data handling features such as weighted fair queuing are not needed, they can be turned off.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
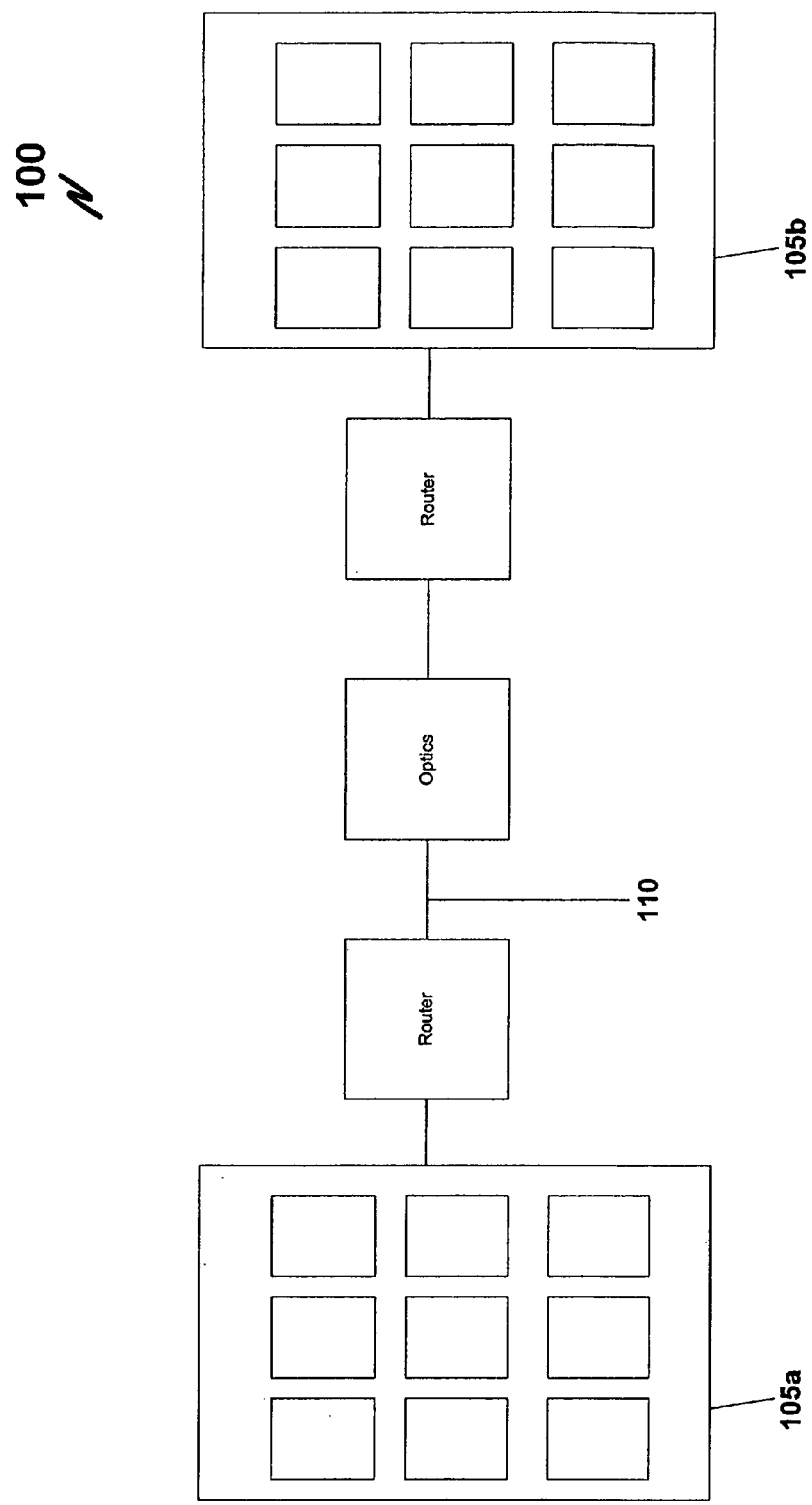
FIG. 1 illustrates a present network system connecting portions of an enterprise with a dedicated line.

Although the present invention is open to various modifications and alternate constructions, a preferred exemplary embodiment that is shown in the drawings is described herein in detail. It is to be understood, however, that there is no intention to limit the invention to the particular forms disclosed. One skilled in the art can recognize that there are numerous modifications, equivalents and alternative constructions that fall within the spirit and scope of the invention as expressed in the claims.

Referring now to FIG. 1, there is illustrated a present network system 100 connecting two portions of an enterprise (105a and 105b) with a statically defined, dedicated line 110. As previously discussed, the enterprise may be forced to rent the dedicated line 110 for an entire month even if the line 110 is only used for a few days of that month. Thus, the line 110 (or at least the provisioned portion of the line 110) can sit idle for the majority of the time. Obviously, by allowing the line 110 to sit idle, valuable network resources that other enterprises could utilize are wasted, and the enterprise renting the line is forced to pay for services that it is not using.

Figure 2:
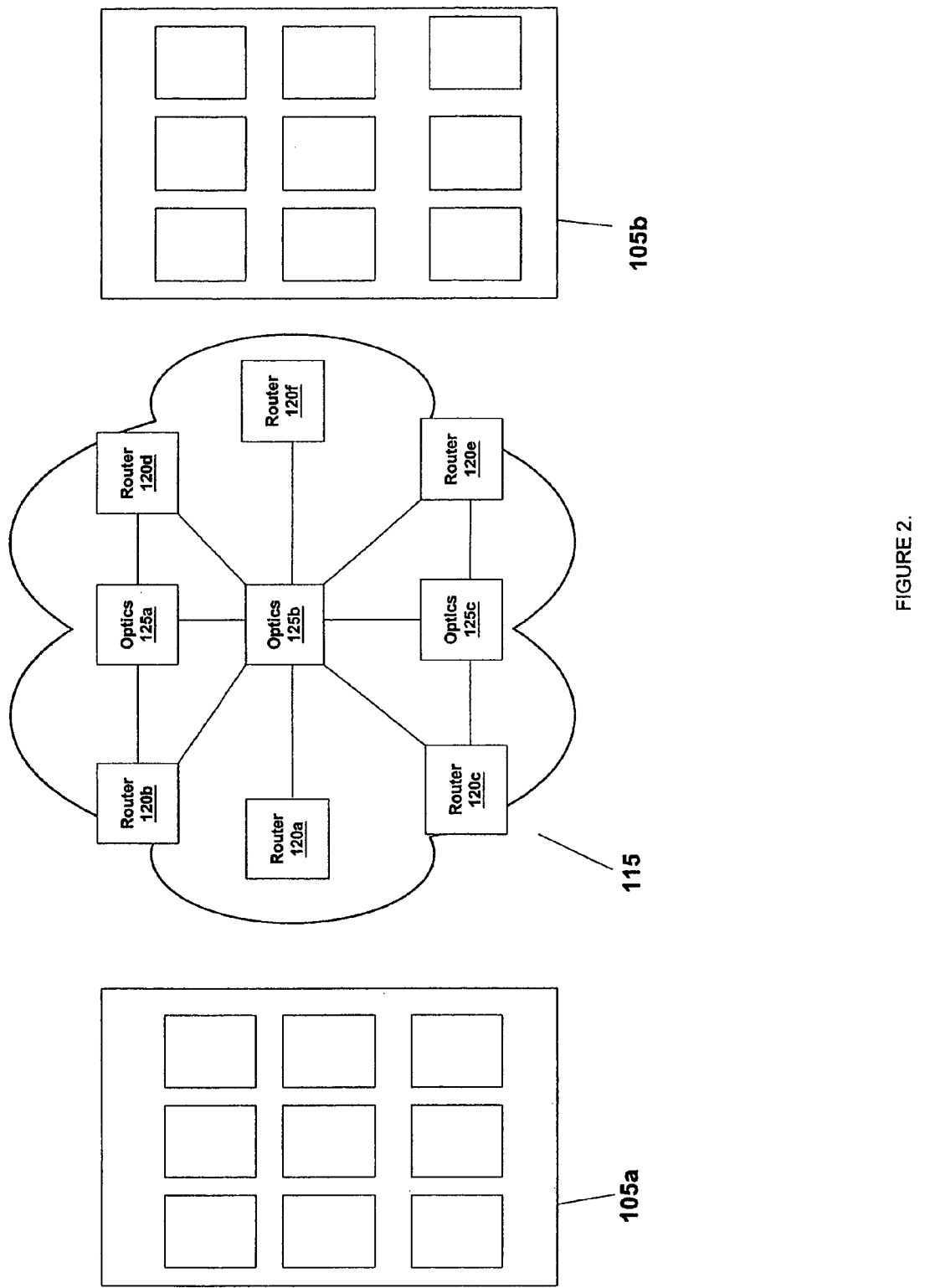
FIG. 2 illustrates a dynamically configurable network system, in accordance with the present invention, that can be optimized for efficient data transfers.

Referring now to FIG. 2, there is illustrated a dynamically configurable network 115 that can be optimized for efficient data transfers. In this embodiment, the two portions of the enterprise are connected to a network 115 that includes a plurality of routers 120 and optical devices 125. (As one skilled in the art can understand, the configuration of the routers 120 and optical device 125 in FIG. 2 is merely exemplary.) Rather than renting a statically defined, dedicated line 110 (shown in FIG. 1), the enterprise can request that a virtual, dedicated line be temporarily provisioned within the network 115. This concept of requesting and providing a virtual, dedicated line on demand may be referred to as "just-in-time provisioning." For example, an enterprise could request, from the network provider, a guaranteed bandwidth of 1.544 Mbps (equivalent to a T1 line) between two points for a period of two days starting in five minutes. Normally, the network provider could not fill such a request because configuring the network to provide such a bandwidth would take significantly longer than five minutes. Moreover, a network provider could not fill such an order because, with present technology, it would not be economically feasible to establish the requested service for such a short period of time. In fact, configuring a path to reserve that amount of bandwidth can take weeks with the present technology.

Using the present invention, however, the network provider could perform just-in-time provisioning and provide enterprises with the requested bandwidth for the requested time frame. Network providers can perform this just-in-time provisioning through a dynamic configuration of the relevant network devices. Assume, for example, that optical device 125b and its associated lines could provide the bandwidth requested by the enterprise. This optical device could be dynamically identified and dynamically configured to reserve the requested bandwidth for the requested timeframe. Moreover, router 120a and router 120f could be dynamically configured to route data from the enterprise to optical device 125b rather than to any other network device and associated path.

In one embodiment of the present invention, the dynamic configuration of network devices is achieved through directory-based networking. One example of directory-based networking is described in commonly owned and assigned patent application Ser. No. 09/730,864 entitled *System and Method for Configuration, Management and Monitoring of Network Resources*, filed on Dec. 6, 2000. Briefly, directory-based networking involves storing a configuration record for each network device in a central repository. When a network device needs to be reconfigured, the centrally-stored configuration record for that device can be retrieved and altered. The altered configuration record can then be used to generate the device-specific code needed to reconfigure the relevant network devices. Finally, once the device-specific code has been generated, that code is provided (either through a push or get) to the appropriate network device(s). Thus, by using directory-based networking, network devices can be dynamically configured with a minimal amount of actual human intervention, thereby allowing for just-in-time provisioning of network resources.

Figure 3:
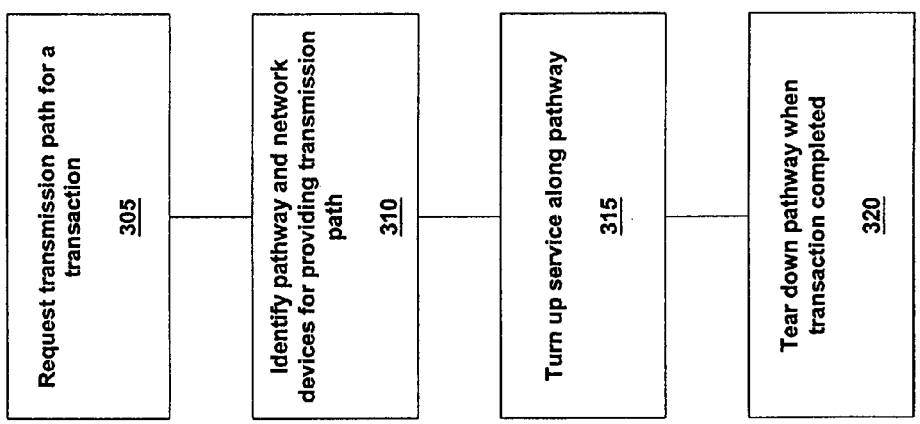
FIG. 3 is a flowchart of the process of bandwidth optimization on a network system such as the one in FIG. 2.

Referring now to FIG. 3, there is illustrated a flowchart of the process of bandwidth optimization on a network system such as the one in FIG. 2. In particular, FIG. 3 describes the process for optimizing the utilization of a fiber optic line or any other type of line. Initially, an enterprise requests a bandwidth of a certain size between two points for a particular timeframe (or for a particular volume of data). Next, a path 305 and the associated network devices that can provide the requested bandwidth are identified 310. The network devices along that path are then configured to provide the requested bandwidth 315. For example, the optical devices along the identified path can be configured to reserve the requested bandwidth for the requesting enterprise. Once the requested timeframe has expired, the optical devices can be returned to a default setting, thereby tearing down the temporary dedicated path 320. The network resources previously dedicated to the enterprise's path are now returned to the pool of network resources where they can be accessed by other enterprises.

Accordingly, one embodiment of the present invention provides a method for just-in-time provisioning of network resources. In particular, this embodiment provides a method for easily and dynamically establishing and tearing down a virtual, dedicated transmission path. With the present invention, enterprises can request and pay for only those network services that they need. Moreover, through the present invention, network providers can better utilize network resources by returning unused network resources to a pool of generally available resources. In prior art systems, these unused network resources could have remained dedicated to a single enterprise whether or not they were actually being used.

Figure 4:
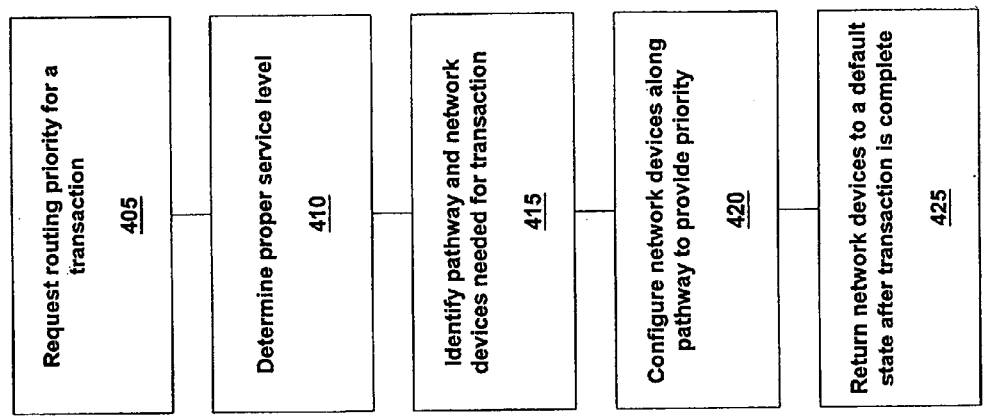
FIG. 4 is a flowchart of the process of routing optimization on a network system such as the one shown in FIG. 2.

Referring now to FIG. 4, there is illustrated a flowchart of the process of routing optimization on a network system such as the one shown in FIG. 2. In this embodiment, routers and similar devices can be optimized to efficiently handle data based upon the priority of the data. As with bandwidth optimization, routing optimization can be enabled by directory-based networking principles that allow for dynamic configuration of network devices. In this particular embodiment, prioritization features of routing devices can be selectively enabled and disabled to route data based upon priority of that data.

Initially, an enterprise may request that data be routed with a high priority or that the enterprise be given a certain routing priority for a particular timeframe 405. In either case, the network provider can determine the enterprise's service level and link that service level to a priority 410. For example, if the enterprise has a top level service agreement, that enterprise may have access to the highest level of priority that the network provider can give. Alternatively, if the enterprise has a lower level service agreement, that enterprise may only have access to a mid-level priority. By tiering priority in this fashion, enterprises can select and pay for the level of service that they need. Moreover, network providers can maximize network resources and revenue by providing higher priority service(s) to those customers that need it and that are willing to pay for it.

Responsive to an enterprise requesting that data be routed with a certain priority, a pathway can be identified 415 and routers along that pathway can be dynamically reconfigured to enable priority data handling features such as weighted fair queuing 420. With these priority data handling features enabled, higher priority data can be routed before lower priority data.

As previously described, weighted fair queuing is effective for routing data based upon priority but can cause network congestion and router failure when used unnecessarily. The present invention addresses this problem by allowing for weighted fair queuing and similar priority data handling features to be dynamically disabled 425. In other words, weighted fair queuing can be turned off when not needed without significant difficulty.

Notably, the present invention allows for the concurrent operation of bandwidth optimization and routing optimization. For example, an enterprise could request a virtual dedicated line and also request routing priority to that line. The network provider could provision these services based upon a service level agreement with the enterprise.

Figure 5:
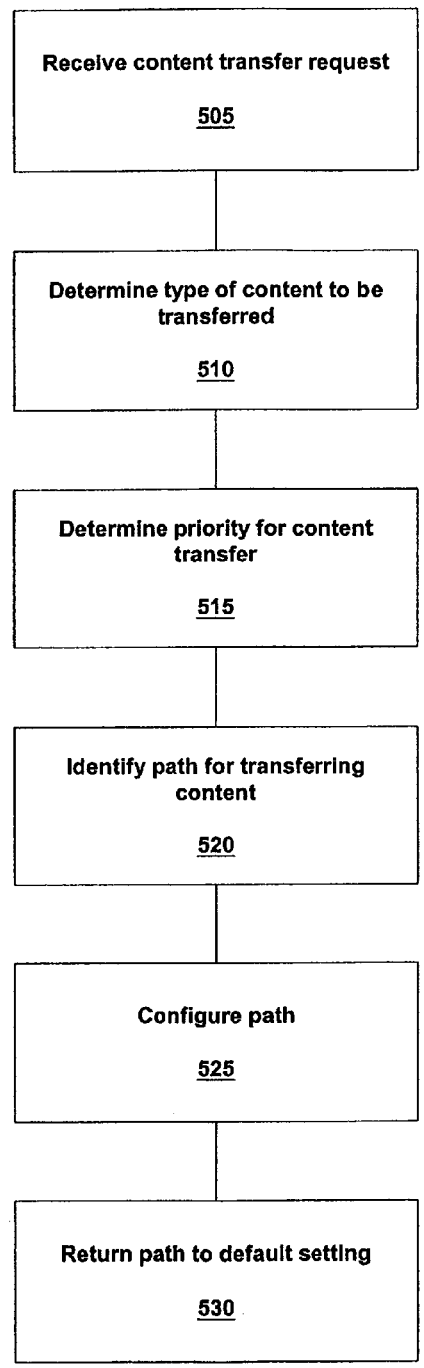
FIG. 5 is a flowchart of the process of content transfer optimization on a network system such as the one shown in FIG. 2.

Referring now to FIG. 5, there is illustrated a flowchart of the process of content transfer optimization on a network system such as the one shown in FIG. 2. In this method, an enterprise can notify its network provider that it has a block of data to be moved between two points within certain quality parameters 505. The quality parameters can be directly indicated, e.g., specified delivery time, or they can be determined according to the type of content being transferred 510. For example, movement of disk mirroring content may take a higher priority than movement of replication content.

After the request for content transfer has been made and the importance of that transfer has been determined 515, the path for transferring that content can be identified 520. If the requesting enterprise is utilizing a virtual dedicated line, the content transfer can be made using that line. Additionally, the routers connected to that line can be configured such that weighted fair queuing is enabled 525 for this content transfer and disabled when the transfer is complete 530. Alternate embodiments involve differing combinations of bandwidth optimization and content optimization. As with bandwidth optimization and routing optimization, content-delivery optimization can be achieved, in a variety of ways, including through the use of directory-enabled networking.

In conclusion, the present system provides, among other things, a system and method for optimizing the utilization of network resources. Those skilled in the art, however, can readily recognize that numerous variations and substitutions may be made in the invention, its use and its configuration to achieve substantially the same results as achieved by the embodiments described herein. Accordingly, there is no intention to limit the invention to the disclosed exemplary forms. May variations, modifications and alternative constructions fall within the scope and spirit of the disclosed invention as expressed in the claims.

What is claimed is:

1. A method for optimizing data transmissions, the method comprising the steps of:
    receiving a request for routing priority for a transaction, the request being originated by a content provider;
    identifying a service level available to the content provider;
    determining a data transmission priority level to which the content provider is entitled, the data transmission priority level is based upon, at least, the identified service level and the request for routing priority;
    identifying at least a first transmission path accessible by the content provider, wherein the first transmission path includes at least a first network device;
    enabling a priority data handling feature associated with the at least a first network device;
    responsive to completion of the transaction associated with the received request, disabling the enabled priority data handling feature;
    retrieving a configuration record from a central repository of configuration records, the retrieved configuration record being unique to the at least a first network device and the retrieved configuration record including configuration information about the at least a first network device;
    altering the configuration record to include an indication that the priority data handling feature should be enabled on the at least a first network device; and
    generating a device-specific command using the altered configuration record;
    wherein the generated device-specific command is for enabling the priority data handling feature associated with the at least a first network device.

2. The method of claim 1, wherein the transaction is defined at least partially in terms of a timeframe.

3. The method of claim 1, wherein the transaction is defined at least partially in terms of a volume of data.

4. The method of claim 1, wherein the step of identifying at least a first transmission path comprises the step of:
identifying at least a first router on that transmission path.

5. The method of claim 1, further comprising the step of:
generating device-specific commands for the at least a first of the plurality of network devices;
wherein the generated device-specific commands are configured to enable the priority data handling feature associated with the at least a first of the plurality of network devices.

6. A method for transferring data, the method comprising the steps of:
receiving a content transfer request;
determining the transfer priority of the content associated with the content transfer request;
identifying a path for transferring the content associated with the content transfer request the identified path including a plurality of network devices;
configuring at least a first of the plurality of network devices to assist in a content transfer corresponding to the content transfer request;
responsive to the completion of the content transfer request, returning the at least a first of the plurality of network devices to a default setting;
generating device-specific commands for the at least a first of the plurality of network devices;
wherein the generated device-specific commands are configured to enable a priority data handling feature associated with the at least a first of the plurality network devices;
retrieving a configuration record from a central repository of configuration records, the retrieved configuration record being unique to the at least a first of the plurality of network devices and the retrieved configuration record including configuration information about the at least a first of the plurality of network devices;
altering the configuration record to include an indication that the at least a first of the plurality network devices should be enabled to assist in providing the determined bandwidth; and
generating a device-specific command using the altered configuration record;
wherein the generated device-specific command is for configuring the at least a first of the plurality network devices.

7. The method of claim 6, further comprising the step of:
altering the configuration record to include another indication that the at least a first of the plurality of network devices should be configured to disable the determined bandwidth.

8. The method of claim 6, further comprising the step of:
altering the configuration record to include another indication that the priority data handling feature should be enabled on at least a second network device.

9. The method of claim 8, further comprising the step of:
generating a device-specific command using the altered configuration record;
wherein the generated device-specific command is for enabling the priority data handling feature associated with the at least a second network device.

10. The method of claim 1, wherein the step of receiving the content transfer request comprises:
receiving a content provider identifier and a data volume indicator.

11. The method of claim 10, wherein the step of receiving the content transfer request further comprises:
receiving a data priority indicator.

12. The method of claim 11, wherein the step of receiving the data priority indicator comprises:
receiving a data type indicator.

13. The method of claim 12, wherein the step of determining the priority comprises the step of:
determining the transfer priority based upon, at least, the data type indicator.

14. The method of claim 6, further comprising the step of:
determining a bandwidth for transferring the content within the requirements of the determined transfer priority; wherein the generated device-specific commands are further configured to enable the at least a first of the plurality of network devices to assist in providing the determined bandwidth.

15. A method for transferring data, the method comprising the steps of:
receiving a content transfer request;
determining the transfer priority of the content associated with the content transfer request;
identifying a path for transferring the content associated with the content transfer request, the identified path including a plurality of network devices;
configuring at least a first of the plurality of network devices to assist in a content transfer corresponding to the content transfer request;
responsive to the completion of the content transfer request, returning the at least a first of the plurality of network devices to a default setting;
generating device-specific commands for the at least a first of the plurality of network devices;
wherein the generated device-specific commands are configured to enable a priority data handling feature associated with the at least a first of the plurality network devices;
retrieving a configuration record from a central repository of configuration records, the retrieved configuration record being unique to the at least a first of the plurality of network devices and the retrieved configuration record including configuration information about the at least a first of the plurality network devices;
altering the configuration record to include an indication that a priority data handling feature should be enabled at least on the at least a first of the plurality of network devices; and
generating a device-specific command using the altered configuration record;
wherein the generated device-specific command is for configuring the at least a first of the plurality network devices.

16. The method of claim 15, further comprising the step of:
altering the configuration record to include an indication that the at least a first of the plurality of network devices should be configured to disable the requested bandwidth.

17. The method of claim 15, further comprising the step of:
generating device-specific commands for the at least a first of the plurality of network devices;
wherein the generated device-specific commands are configured to enable the at least a first of the plurality of network devices to assist in providing the requested bandwidth.

* * * * *